Nov. 10, 1942.　　　A. M. MOEN　　　2,301,439
MULTIVALVED FAUCET
Filed April 12, 1940　　　2 Sheets-Sheet 1
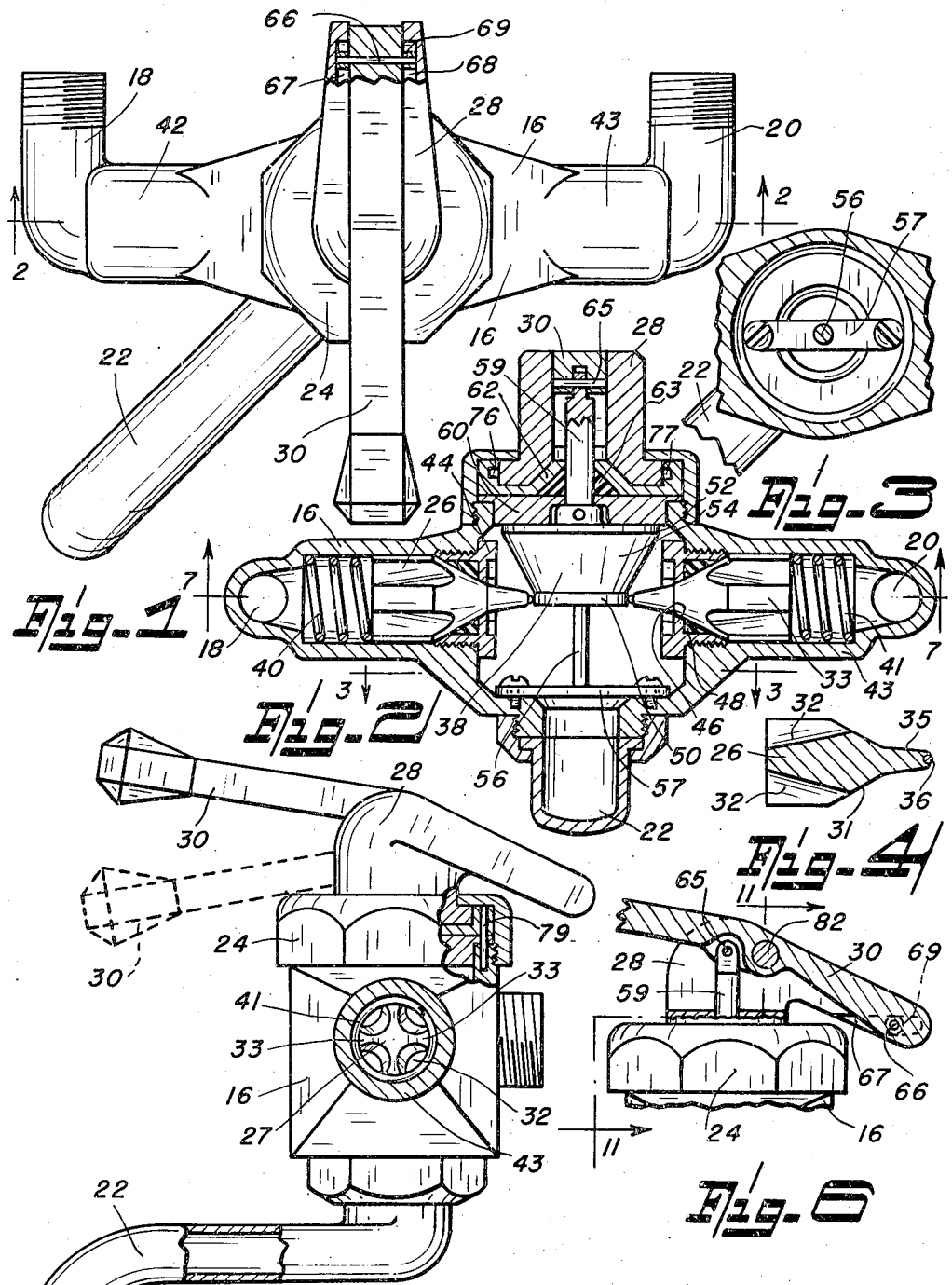
INVENTOR
Alfred M. Moen
BY
Smith & Tuck
ATTORNEYS Nov. 10, 1942.  A. M. MOEN  2,301,439
MULTIVALVED FAUCET
Filed April 12, 1940   2 Sheets-Sheet 2
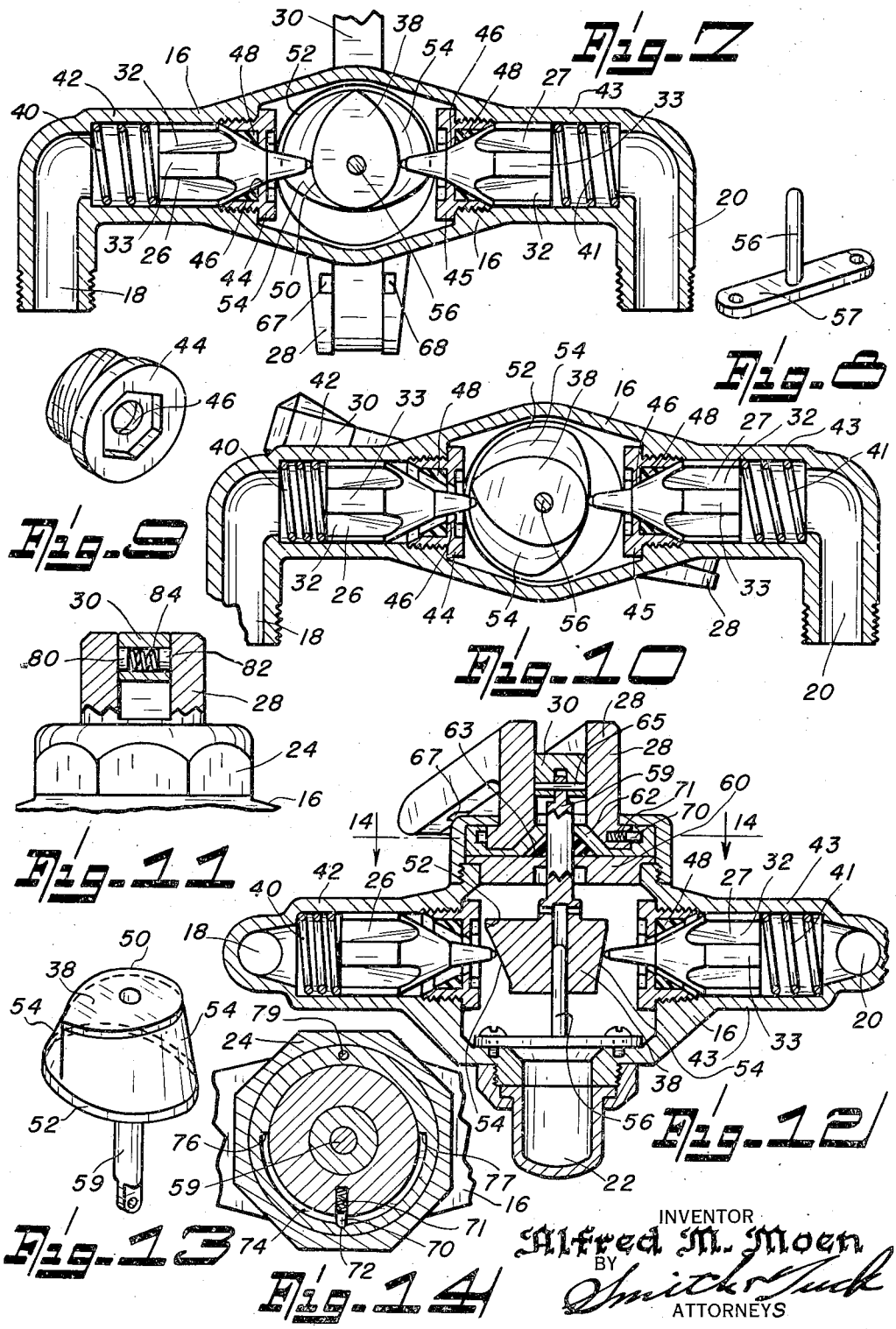
INVENTOR
Alfred M. Moen
BY
Smith Tuck
ATTORNEYS Patented Nov. 10, 1942

2,301,439

UNITED STATES PATENT OFFICE 2,301,439

MULTIVALVED FAUCET

Alfred M. Moen, Seattle, Wash.

Application April 12, 1940, Serial No. 329,285

3 Claims. (Cl. 277—18)

My present invention relates to the general art of faucets and more particularly to a multivalved faucet of the type employed in sinks, lavatories, and bathtubs, and for various commercial usages where it is desired to provide, in a single valve, means for controlling hot or cold water independently of the other and means for mixing the two and controlling the amount of such mixed flow.

My faucet consists essentially in providing, in a unitary structure, two spring-seated valves which are disposed, one each in the hot and cold water pipes, so that the pressure in the water lines acts to further seat the valves.

In operating relationship with the two spring-seated valves is a cam valve actuator having flared side walls, thus providing operating faces of considerable extent. When the handle is rotated, the cam may be so positioned as to selectively operate either the cold or hot water valve at any volume desired. Then by downward pressure—as distinct from rotary movement of the operating handle—the tapering face of the cam serves to control the amount of water discharged and, if placed in any intermediate position between the ends of the cam, will open the hot and cold water valves simultaneously but give the operator the ability to select the ratio between the hot and cold water to be admitted to the valve actuating chamber in the housing. In this manner either cold or hot water, or a mixture of both in varying amounts from nothing to capacity of the service line, can be discharged from the valve. It follows that the intermediate settings will maintain the desired ratio between the hot and cold water, and at the same time permit the user to have full control of the discharge from the combined service lines, of the hot and cold water.

The principal object of my present invention is, therefore, to provide means for selectively proportioning the amount of discharge of either cold or hot water through a single discharge opening and, by a secondary movement of the control handle, to control the volume discharged and to mix the two simultaneously at the ratio desired.

A further object of my present invention is to provide a compound valve arranged so that by a single lever an operator can quickly rotate the valve to discharge either or both hot or cold water and then, by downward pressure on the control lever, determine exactly the amount of mixture desired.

Another object of my invention is to provide, in a single compound valve, an economical means for the complete control of hot and cold water lines so as to discharge the same from a single discharge opening.

Still another object of my invention is to provide means which, to a large degree, eliminate frictional wear in a compound valve arrangement so that, once the valve is calibrated, or adjusted, it can be depended upon to give mixtures of hot or cold water that will be uniform over long periods of use.

A further object of my present invention is to provide a compound valve which will be easily serviced so that if, after long periods of use, wear should occur in certain parts, the same can be economically replaced.

Another important object of my invention is to provide means whereby the complete operating assembly of my compound valve can be removed from the housing without the necessity of employing auxiliary shut off valves in the hot and cold water lines.

It will be apparent during the course of the following description that while I have disclosed my invention as applied to a faucet, there are many other installations wherein the principles and assembly of a multi-valved device can be used. For example, in principles herein disclosed are equally applicable to any mixing device for fluids and need not be specifically applied to a faucet. Therefore, I do not wish the scope of my invention to be limited to the application of said invention to the faucet, but rather the description herein is merely illustrative.

Other and more specific objects will be apparent from the following description taken in connection with the accompanying drawings herein.

Figure 1 is a top plan view of a valve made after the teachings of my present invention.

Figure 2 is a vertical, sectional view taken along the line 2—2 of Figure 1.

Figure 3 is a cross-sectional view taken along the line 3—3 of Figure 2.

Figure 4 is a cross-sectional view through one of my shut-off valves.

Figure 5 is a side elevation of my compound valve, certain parts being shown in section to better illustrate the structure involved.

Figure 6 is a fragmentary view in elevation, partly in section, showing the manner in which my operating handle is secured to the handle bracket.

Figure 7 is a horizontal, sectional view taken along the line 7—7 of Figure 2.

Figure 8 is a perspective view illustrating the lower actuator guide means and the base to which it is secured.

Figure 9 is a perspective view illustrating my valve seat, one of which is required for the hot and one for the cold water valve.

Figure 10 is a view similar to Figure 7 but showing my cam in a different, angular position, and thereby showing one of the valves opened while the other has been unaffected.

Figure 11 is an elevation, partly in section, taken taken along the line 11—11 of Figure 6.

Figure 12 is an elevational, sectional view similar to Figure 2 but showing my operating cam as depressed with both the hot and cold water valves shown off their seats in varying degrees.

Figure 13 is a perspective view showing my valve actuator in reversed position from that of the various elevational views.

Figure 14 is a sectional view to show the stop means employed to limit the rotation of my operating handle, and the center indicating means, taken along section line 14—14 of Figure 12.

Referring to the drawings, throughout which like reference characters indicate like parts, 16 designates the main housing of my valve. This should be of a general design so as to accommodate it to the various arrangements of supply lines that are now commonly employed. An alternate arrangement for particular usages, especially in the commercial field, may depart from that shown in the present drawings. The form shown throughout my present drawings is intended to serve as an original installation unit, or a replacement unit, where the cold and hot water supply lines are brought through the wall, somewhat spaced from each other. This provides the two water supply members 18 and 20, either of which may be for hot or cold water. Connections to the service lines are made through these L portions 18 and 20 by the usual couplings normally used by plumbers. The lower side of housing 16 is provided with the conventional swing spout 22 and on its upper side a relatively large assembly nut 24 is employed. With my present arrangement it is necessary that this nut be of a size sufficient that the removal of the same will give access to the interior of the housing, so that the water shut-off valves, as 26 and 27, with their associated springs, seating nuts, and the like may be inserted through the open top of housing 16. Nut 24 secures in operating position—in addition to other parts—the handle bracket 28, to which is operably secured handle 30.

Valves 26 and 27, which are identical in structure, are quite well illustrated in the various sectional views and in Figure 4. Each is provided with a tapered valve cone 31 and a plurality of flutes at 32, which permit the water to flow around the valves, while the solid metal remaining at 33 between the flutes provides a plurality of guides for the valves in their endwise movement. At their opposite ends each of valves 26 and 27 is provided with an outwardly extending cone extension finger 35 in the extreme end of which is provided, preferably, an inset ball 36. This ball has as its purpose the reducing of friction as it bears upon the inclined surface of the valve actuator 38. In addition to reducing friction, this construction provides a replaceable unit which may be easily and cheaply replaced to compensate for wear which may occur over extended periods of use.

While I have described the valves 26 and 27 as having flutes 32, it is to be understood that any reasonable equivalent of this cone type valve may be used, and that actual grooves are not necessary as it suffices in some instances to merely provide flattened faces along the length of the valve body.

Valves 26 and 27 are normally subjected to the pressure of the water in the supply lines which cause them to seat. There may be conditions under which, however, the pressure in the two lines may temporarily be different. Then, where low pressures are encountered, there might be a sluggishness in the closing of the valves. To guard against this condition I provide each of the valves with a seated compression spring, as 40 and 41. These springs are seated in the enlarged valve chambers 42 and 43, respectively. The springs are preferably of enlarged diameter so as to fit snugly against the walls of the chambers 42 and 43, and to engage the guide portion 33 of the valves. In this manner it will be noted, particularly in Figure 12, that water coming into the supply lines will pass through the spring so that no amount of compression therein will tend to shut off the water flow. It is desirable that chambers 42 and 43 be considerably increased in size over the diameter of the supply line so that there will be, in the flutes 32, an excess area over and above the supply pipe so that there will never be any retarding of flow by the valves themselves.

Valves 26 and 27 are installed by having cap nut 24 and its associated parts removed from the housing 16. Then the springs and valves can be placed in chambers 42 and 43 and the valve seats or packing nuts 44 and 45 may then be screwed into place in housing 16. The flange of the packing nut provides a tapered seat at 46 in addition to which a yieldable packing is installed in each of the valve nuts as indicated at 48. This insures a positive seating for the cones of the valves, one which will require servicing and renewal only after long periods of use.

Operably disposed, so as to control the movement of both valves 26 and 27, is the cam member 38. Throughout my drawings, for sake of simplicity, I have shown the two valves as being diametrically opposed. However, it will be apparent, it is believed, that this relationship need not always exist. For the arrangement shown, the general shape of the tapered actuator cam 38 is probably best illustrated in Figure 13. If, however, the valves were placed parallel to each other, as though the water supply came from the bottom of a modified housing, it would then be necessary to change the angle of the side of the actuator cam so that it would, in effect, come almost to a point on its lower end. The operation in such cases would, however, be identical with that described, so illustration of that form has been dispensed with.

The true contour of the actuator 38 is probably best seen in the plan views of Figures 7 and 10 in which the numeral 50 designates the smaller cam portion on the lower face of the member 38. This cam conforms approximately to the shape of a tear-drop and has both a pointed end and a semi-circular end. The body of the actuator rises vertically above the pointed and semi-circular ends of the cam portion 50, but it has an outward inclination intermediate of these ends to produce the flaring side walls or faces 54, 54. The upper face of the actuator device has the contour indicated in the drawings by the numeral 52. The exact proportions of this actuator of necessity must conform to the structural features of the balance of the assembly. The design shown in Figures 7 and 10 will perform all the functions itemized in the objects of this invention. It will open either the hot or cold water independently, or will—at intermediate positions—give any desired mixture of the hot and cold water which mixture can be had by merely pressing down and rotating the actuator. As soon as the ratio and volume of hot and cold water has been made by selection, the tapering faces 54, 54, of the actuator will then open the valves in that ratio as it is pressed downwardly, and interposes more of its tapered body between the tips of the valve cones.

To prevent misalignment of actuators 38, I have provided a guide pin 56 which slides in a vented bore in cam 38. This member is secured to a foot 57, which in turn is secured by the screws illustrated in Figure 12 to the body of housing 16. It will be noted that this foot should be of narrow width so as not to close the discharge passageway going into spout 22.

On its upper surface, actuator 38 is provided with an upstanding stem 59. This stem passes through guide washer 60, then through a packing disc 62, which is so arranged as to support packing material 63 which prevents water flowing up around stem 59. Such a flow, however, normally does not occur unless the pressure is out of proportion to the area and capacity of spout 22. At its upper end stem 59 is pivotally secured to handle 30 by a pin 65 passing through lugs on the handle and the reduced portion of stem 59. As stem 59 must of necessity travel in a straight line, means must be provided for the longitudinal movement of handle 30 as it is raised or lowered. This is accomplished by providing handle 30 with a pin as 66 which passes through the end thereof, but should not be fixed therein. The ends of the pin are provided with rollers 69. These rollers are held in position by engaging guide-ways cut within the handle bracket member at 67 and 68.

It will be noted, from a study of Figures 2 and 12, that the handle bracket member 28 is disposed for partial revolution, being held in place by flanged nut 24. It is desirable, however, to limit the rotation of handle 30. To this end I have provided, within the handle bracket, a stop member 70 which is urged outwardly by spring 71 and normally engages a depression or groove 72 which is formed within an upward extension, or flange, of disc 62. The disc is cut away, as noted at 74 in Figure 14, so that the handle may be revolved through 180° and then come up against the positive stops 76 and 77. These stops limit the movement of the handle so as to place actuator 38 in a position to give the maximum flow of the hot and cold water, each separately. The center portion, indicated by groove 72, is the normal shutoff position. The handle normally should be left here when one is through using the valves. The guide washer 60 and the packing disc 62 are held in position by the pin 79 which passes through them and is seated in the housing 16.

To hold the cam in any depressed position the handle 30 is provided with a friction brake which consists of two metal discs 80 and 82, urged apart by a compression spring 84, so that the discs will have a sliding, frictional, engagement with the handle bracket 28.

Method of operation

Normally the handle of my compound valve is in its mid position as indicated in Figure 1, in which case, stop 70 is engaged in groove 72 and the actuator 38 is in the position shown in Figure 7. If the handle is pressed downwardly to the dotted line position, as shown in Figure 5, an equal amount of hot and cold water will be drawn and discharged through spout 22. If the handle is moved to the extreme positions so as to abut stops 76 or 77, only one valve will be operated, after the showing of Figure 10. This might be either hot or cold according to the direction in which the operator moves the handle. It will then follow that by depressing the handle it is possible, at any intervening point of the cam, to open both of valves 26 and 27 with any relationship toward each other. By this means, one quarter of the volume might be cold water and three-quarters hot, or the reverse of this, or any other desirable ratio may be obtained. The volume and temperature of the mixed water is controlled by both a downward pressure on handle 30 and by revolving movement of the same. At this point I desire to point out that the angle of cam face 54 will control whether or not handle 30 will remain in its depressed position. The pressure of the water against the forward face of the valves 26 and 27 forces the rotatable inset balls 36 of the valves against the tapered faces 54, 54, of the valve actuator 38, thus tending to force this cam upward. The angle of the cam faces 54, 54 is constructed steep enough to counteract this tendency.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

Having thus fully described my invention, what I claim as new and desire to secure by Letters Patent is:

1. In a multi-valved faucet of the type having a main housing formed with a valve actuator chamber and including a pair of fluid adit passages associated therewith as well as a fluid exit means and employing a pair of cone valves each mounted in an adit passage for endwise movement therein for closing a valve seat, a mechanism for moving said cone valves comprising an upwardly flaring valve actuator cam operably interposed between said cone valves and having an upstanding stem; a packing disk in the open end of the actuator chamber and encircling the upstanding stem; a flanged rotatable handle bracket seated on said packing disk; an assembly nut enclosing the flange on the handle bracket and cooperable with the said main housing to secure said packing disk and handle bracket in place; and a lever cooperable with said upstanding stem to rotate the same and to lower and raise said actuator cam, said lever being pivotally connected at one end in said handle bracket offset from the axis of said upstanding stem.

2. In a multi-valved faucet of the type including a main housing formed with a valve actuator chamber having a pair of fluid adit passages associated with said chamber as well as a fluid exit means and employing a pair of cone valves each mounted in an adit passage for endwise movement therein for closing a valve seat, a mechanism for moving said valves comprising an upwardly flaring valve actuator cam operably interposed between said cone valves and having an upstanding stem; a handle bracket rotatably supported above said actuator chamber; a lever cooperable with said upstanding stem to turn or depress the same, said lever being pivoted at one end in said handle bracket; and friction means including a pair of spring-pressed buttons between said lever and said handle to retain the lever in adjusted position.

3. In a multi-valved faucet of the type employing a main housing having a pair of fluid adit passages and fluid exit means therefrom and enclosing a pair of valve members each of which is mounted in an adit passage for endwise movement to close the valve seats, a mechanism for moving said valve members comprising a valve actuator member operably interposed between said valve members and including a stem thereon extending upwardly through said housing; a flanged handle bracket mounted on the housing for rotary movement about the axis of said stem; a collar nut associated with said flange and secured to said housing to hold said handle bracket thereon for rotary motion, said handle bracket having a pivot arm; a lever pivoted at its outer end to said arm and pinned to said stem to turn or depress the same, and friction means between said arm and said handle to hold the latter in adjusted position.

ALFRED M. MOEN.